United States Patent [19]
Raiford et al.

[11] 3,913,274
[45] Oct. 21, 1975

[54] METHOD AND APPARATUS FOR MAKING INTEGRATED MULTIFOCAL LENSES

[76] Inventors: Morgan B. Raiford, 705 Juniper St. NE., Atlanta, Ga. 30308; Charles R. Reeves, 3457 Sabrina Court; Harold R. Ingle, Jr., 2665 Jamerson Road NE., both of Marietta, Ga. 30060

[22] Filed: Aug. 9, 1974

[21] Appl. No.: 496,329

[52] U.S. Cl. ............. 51/58; 51/106 LG; 51/165.71; 51/284; 51/322; 82/12
[51] Int. Cl.² ..................... B24B 13/00; B24B 1/00; B24B 17/00
[58] Field of Search ........ 51/33 W, 58, 99, 106 LG, 51/124 L, 162, 165.71, 284, 322; 82/12; 29/106

[56] References Cited
UNITED STATES PATENTS

| | | | |
|---|---|---|---|
| 2,556,604 | 6/1951 | Suddarth | 51/124 L |
| 2,806,327 | 9/1957 | Coburn | 51/33 W |
| 3,468,067 | 9/1969 | Larson | 51/284 X |
| 3,590,532 | 7/1971 | Littlefield | 51/284 X |
| 3,763,597 | 10/1973 | Schlotfeldt | 51/284 X |
| 3,835,588 | 9/1974 | Whitham | 51/58 |
| 3,853,499 | 12/1974 | Larson | 51/284 |

*Primary Examiner*—Al Lawrence Smith
*Assistant Examiner*—Nicholas P. Godici
*Attorney, Agent, or Firm*—David A. Blumenthal

[57] ABSTRACT

A method and apparatus of producing multifocal lenses wherein the prescribed variation in focal length between far vision and near vision may be automatically ground or cut into a lens blank. A simultaneous grinding and polishing technique for plastic lenses is also disclosed.

29 Claims, 9 Drawing Figures

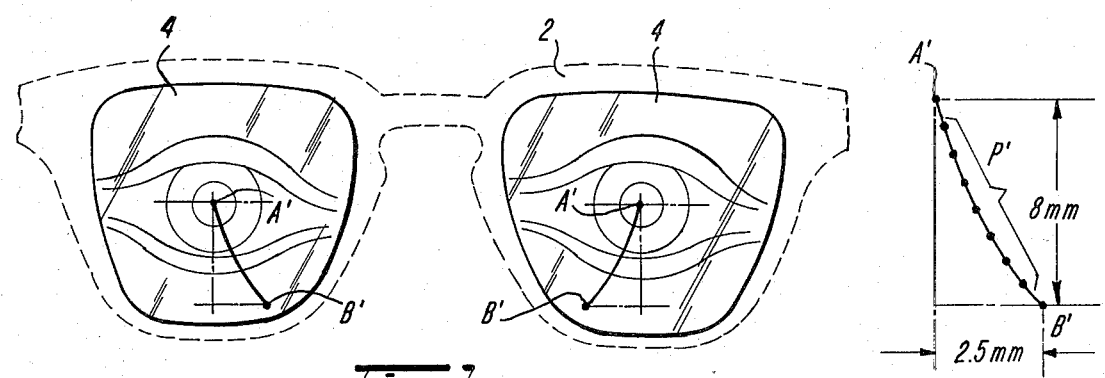
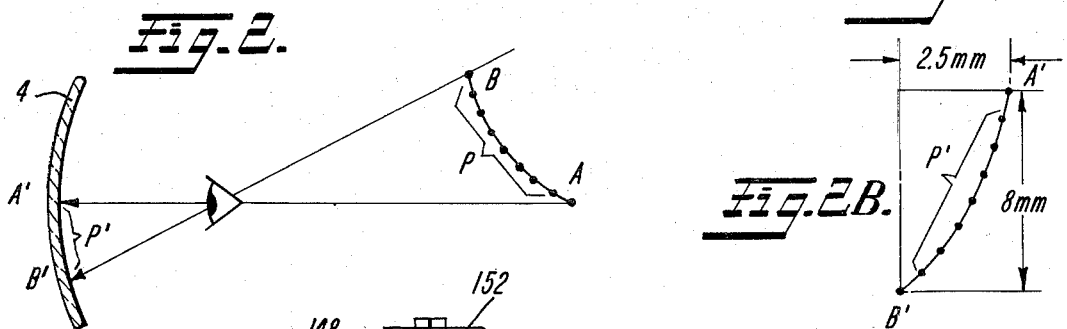
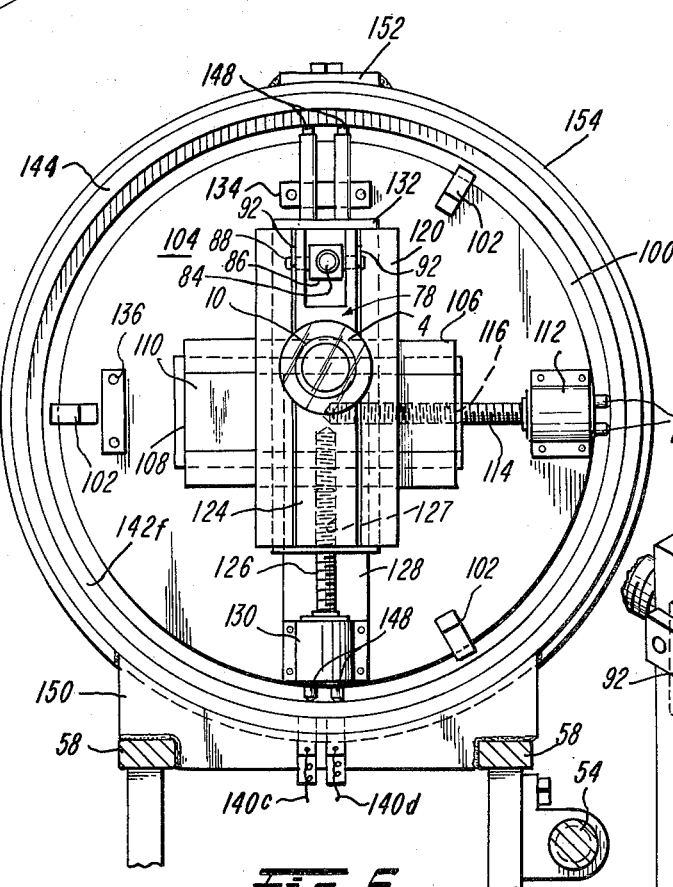
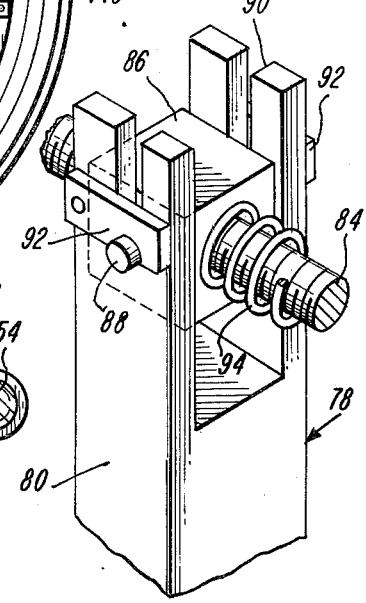

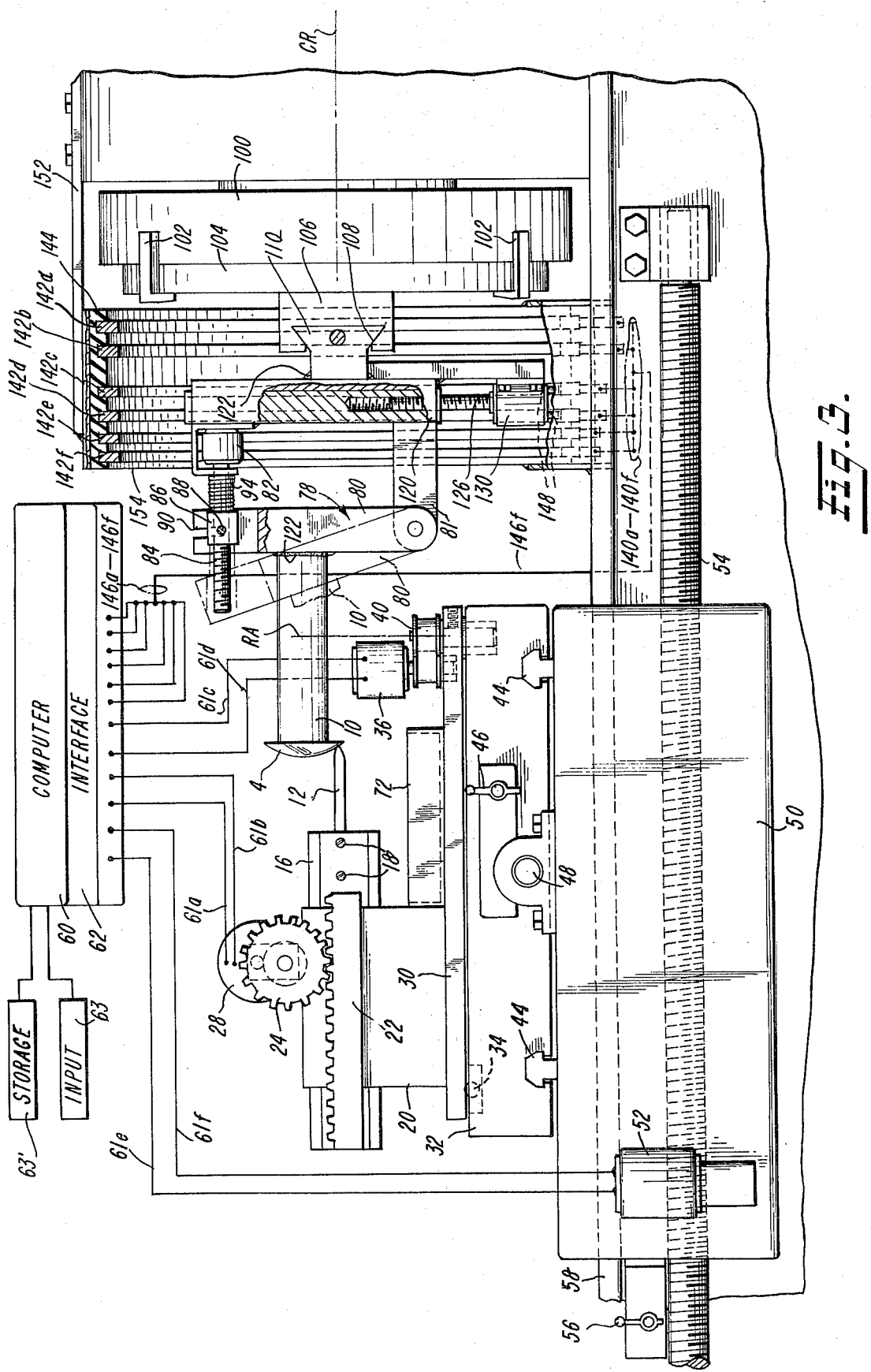

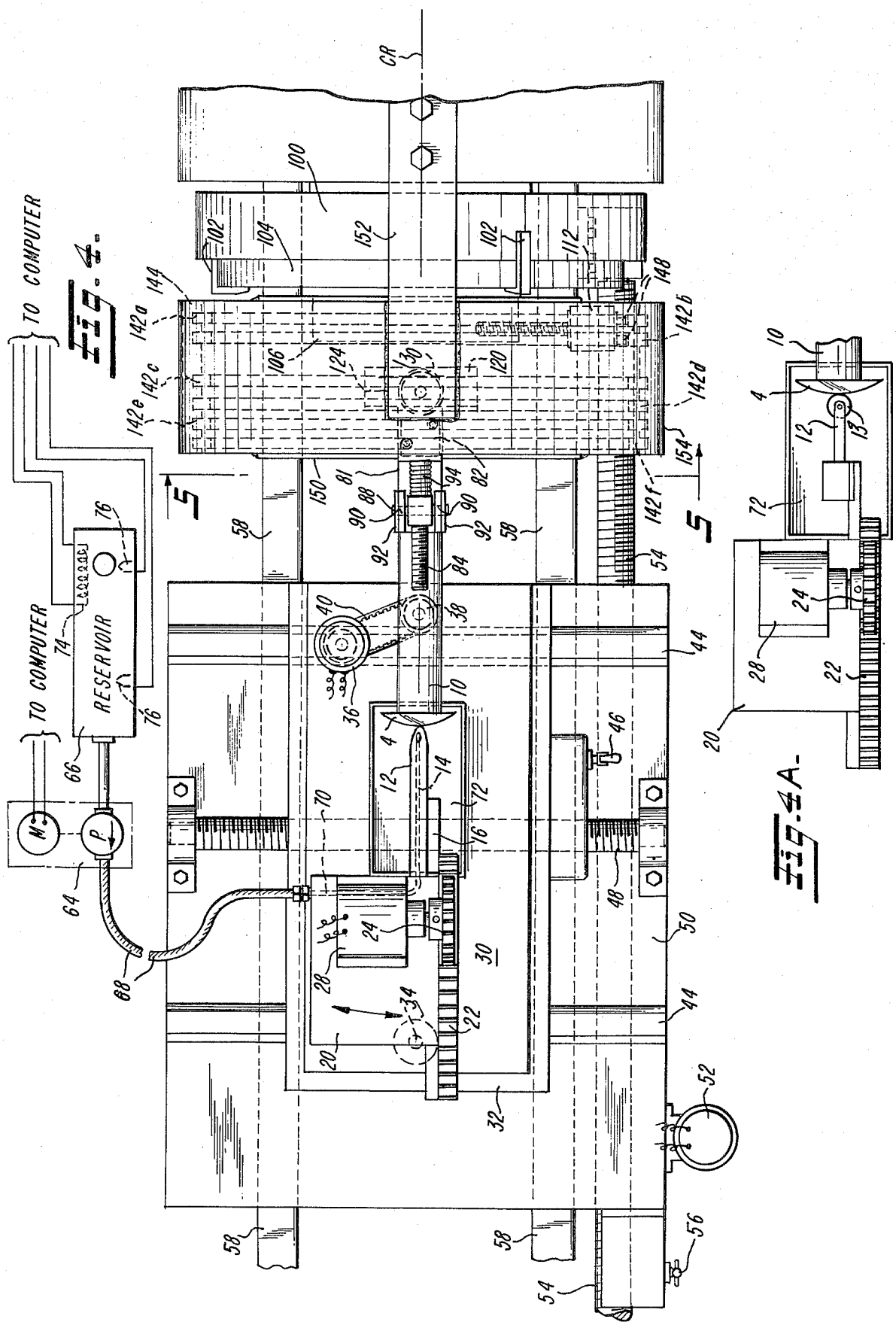

METHOD AND APPARATUS FOR MAKING INTEGRATED MULTIFOCAL LENSES

BACKGROUND OF THE INVENTION

1. Field of the Invention

The invention pertains to a method and apparatus for automatically manufacturing multifocal lenses.

2. Description of the Prior Art

Multifocal lenses and their advantages have been long recognized in the art. Numerous patents deal with the structure and design of multifocal lenses, and incorporate teachings of sophisticated refinements and corrections for various astigmatic defects. Among these patents are Volk U.S. Pat. No. 3,623,800, Maitenaz U.S. Pat. No. 3,687,528, Tsuetaki U.S. Pat. No. 3,684,357 and Tagnon U.S. Pat. No. 3,711,191. A popular prior art multifocal lens is the Varilux lens series which has three separate focal regions. However, even with the progress in the design of multifocal lenses per se, prior art methods of manufacturing multifocal lenses are rather archaic. In particular, individual lens blank models or cam surfaces must be provided for each desired multifocal lens, as shown by Cretin-Maitenaz U.S. Pat. No. 3,041,789 and Volk U.S. Pat. No. 3,239,967. Alternately, the cutting or grinding tool must be specially designed to provide the desired lens, e.g., Evans U.S. Pat. No. 2,112,836 and Volk U.S. Pat. No. 3,344,692.

Numerically controlled automated grinding techniques have been developed as illustrated by Hahn et al. U.S. Pat. No. 3,634,974, Bala et al. U.S. Pat. No. 3,589,078, Aspenden U.S. Pat. No. 3,564,776, and Schoonover et al. U.S. Pat. No. 3,694,970. However, these prior art patents teach two dimensional digital control systems which are not designed for multifocal lens grinding. In addition, the utilization of known digital grinding apparatus for multifocal lenses would not overcome the necessity of providing plural workpieces and/or models to achieve the desired lens diopter variations.

Prior art polishing techniques usually entail a separate rouge polishing method which adds to the time and expense of lens production. The cutting of plastic lenses has proven impractical for all but plastic contact lenses because of the inability to polish the lens after cutting. Thus, plastic lenses for eyeglasses have been manufactured using the mold techniques which are very time consuming and expensive.

SUMMARY OF THE INVENTION

It is an object of the instant invention to provide a method and apparatus for automatically manufacturing a multifocal lens according to a prescribed variable focal length curve which overcomes the disadvantages of the prior art.

It is an additional object of the invention to provide an automatic method of manufacturing a multifocal lens wherein the optical lens may be ground on a lathe to produce the desired variable focal length lens.

Another object of the invention is to effect an automatic nearly simultaneous cutting and polishing apparatus which is particularly adaptable to the cutting and polishing of plastic lenses.

The invention utilizes a conventional lathe having a specially designed lens holder adapted to secure the lens and provide movement in two orthogonal directions in a plane perpendicular to the lathe rotation axis and to change the angle between the surface of the lens and the axis of rotation of the lathe. The position of the lens relative to the lathe rotation axis is controlled by digital equipment including three stepper motors. The tool bit is rotated about a pivot point which is variably controlled to provide different curvature radii for the various segments of the lens blank. The curvature radii is also controlled by digital equipment including a fourth stepper motor. A method of heating the lens during the grinding operation is also provided to effect automatic polishing.

BRIEF DESCRIPTION OF THE DRAWINGS

Other features and objects of the invention may be understood in reference to the detailed description given below as illustrated by the accompanying drawings wherein:

FIG. 1 shows a pair of eyeglasses containing lenses wherein the curve variation is shown between the near and far vision optical centers;

FIG. 2 illustrates a side view of FIG. 1 wherein the radii of curvature for the lens is shown;

FIGS. 2A and 2B illustrate details of the left and right focal length variations as corresponding to the curve shown in FIG. 1;

FIG. 3 is a side view of the lathe apparatus showing a partial cutaway of the lens holder;

FIG. 4 is a top view of the lathe shown in FIG. 3;

FIG. 4A is a fragmentary top view, similar to FIG. 4, showing a modification employing the use of a grinder;

FIG. 5 is a view of the lathe chuck and lens holder as shown by the arrow 5—5 of FIG. 4, and FIG. 6 is an enlarged fragmentary perspective view of the upper portion of the holder tilting bracket, taken on a line 6—6 of FIG. 3.

DESCRIPTION OF THE PREFERRED EMBODIMENT

FIG. 1 illustrates a pair of eyeglasses 2 containing multifocal lenses 4. The points A' and B' indicate the far field optical center and near field optical center, respectively, for the left and right eyes. Generally, the curvature of the line between points A' and B' will be mirror reflections for the left and right lenses, although different curvatures other than mirror reflections would be possible. FIG. 2 illustrates the radii of curvature for the multifocal lens. Line A'-A is the radius of curvature for the far field vision whereas line B'-B is the radius of curvature for near field vision. A series of nine discrete points are shown describing the various radii of curvatures used in the multifocal lens. The point A may for example represent a diopter strength of +8 for the far field distance, whereas point B may represent the diopter strength of +10 for near field vision. Intermediate points P are used as radii to scribe projected points P' on the lens surface. For simplicity, the intermediate projected points P' are not shown in FIG. 1.

The curves shown in 2A and 2B represent the same curves shown in FIG. 1 although expanded in scale. The exact shape of the curve may be prescribed according to the patient's occupation, age, optical balance and extra occular muscle control (Raiford, *The Eye, Ear, Nose and Throat Monthly*, Vol. 47, page 56, October 1968). Thus, the points shown in FIGS. 2, 2A and 2B fully describe a three dimensional curve for the multifocal lens. It generally turns out that a single three dimensional curve, such as the one represented in FIGS. 2, 2A and 2B may be used for a large number of patients. The main variation between patients is not the shape of the curve itself, but rather the diopter strengths of the near and far fields. Thus, by merely specifying the diopter strength of points A and B, a standard curvature is sufficient for a large number of patients. However, variations in the curve slope may readily be prescribed to fit more specific individual needs of the patient. The great simplicity of the manufacturing process permits a tailored multifocal lens for each individual patient as the grinding technique is essentially the same with the only variation being the coordinates of the points specifying the curve.

As shown in FIG. 2, a plurality of nine points may be used in forming or grinding the desired multifocal lens. It has been found that by increasing the focal regions to more than three as is the case in the Varilux lens, a more continuous type lens if produced. While four to eight focal regions produces various degrees of "continuity", nine regions physiologically produces an integral continuous lens without any annoying stepwise variations (lines) which often result in focusing difficulty, particularly in elderly people. However, the instant method and apparatus may be readily employed to produce conventional bifocal lenses or trifocal lenses as well as the more "integral" or "continuous" multifocal lenses.

FIGS. 3 and 4 represent a modified lathe structure utilized in the preferred embodiment of the invention. As shown in FIGS. 3 and 4, a column 10 is utilized to support the optical element or lens 4. The lens may be secured to column 10 by means of any of a number of conventional techniques, such as vacuum suction or adhesives. Lens 4 is ground by means of a tool bit 12 having a channel 14 therethrough. Tool bit 12 is particularly suited for cutting plastic lenses such as those made from polycarbonates, polystyrenes or acrylics. However, glass lenses may also be cut using essentially the same apparatus except that tool 12 is replaced by a motor driven grinder 12' having grinding head 13 (see FIG. 4A). Tool bit 12 is fastened to a slide 16 by means of a plurality of set screws 18. Slide 16 is mounted for slidable movement within receiving block 20. Connected to slide 16 is a rack 22 driven by a pinion 24. The pinion 24 is in turn connected to a first stepper motor 28 which may stepwise rotate the pinion in a clockwise or counter-clockwise rotation. The receiving block 20 is mounted on a base plate 30 which rests on a platform 32. The base plate 30 is movable with respect to the platform 32 and is slightly separated therefrom by means of a ball and socket generally represented at 34.

A second stepper motor 36 is connected to a pin 38 by means of a timing belt 40. The stepper motor 36 and timing belt 40 may be used to rotate pin 38 thereby moving base plate 30 with respect to the stationay platform 32. The movement of base plate 30 effectively rotates the entire receiving block 20 together with the tool bit 12 thereby describing an arc about the pivot point represented by the pin 38. The perpendicular distance between line RA shown through the axis of pin 38 and the tip of tool bit 12 defines the radius of curvature cut into the lens.

Platform 32 may be moved along rails 44 by means of rotation of handle 46 and gear 48. Rails 44 are mounted on a support plate 50 which is itself movable by means of a third stepper motor 52 and a gear 54. A handle 56 may also be used to move plate 50. The support plate 50 is transversely movable along rails 58 (ways) of the conventional lathe apparatus.

Computer means 60 and interface 62 are connected by means of appropriate wires 61a–61f to the stepper motors 28, 36 and 52. Input device 63 and a memory storage unit 63' may also be provided as is explained more fully below.

Also shown in FIG. 4 is a pump and motor assembly generally designated at 64. The pump is utilized to pump a heating fluid from the reservoir 66 through flexible hose 68, an inner flexible tubing 70 and then to the channel 14. A pan 72 is provided with a drain and recirculating means (not shown) to feed the fluid back to reservoir 66. A heater 74 is utilized to heat the reservoir fluid and the temperature may be controlled by means of the computer means 60. Temperature sensing means are designated by numeral 76 and may comprise conventional thermisters connected to the computer means 60.

The lathe chuck is shown in FIGS. 3 and 4 wherein a lens tilting bracket, generally designated at 78, comprises an arm 80 pivotally mounted on a support 81. The column 10 is securely fastened to the arm 80 so as to tilt the lens 4 relative to the lathe rotation axis (designated CR in FIG. 3). The dotted lines in FIG. 3 show a somewhat exaggerated tilt angle to illustrate a tilted position for the arm 80 and column 10. The tilt angle is controlled by means of a stepper motor 82 which drives screw means 84.

A more detailed view of the lens tilting bracket 78 is shown in FIG. 6. A threaded block 86 is pivotally secured to arm 80 by a pin 88. The pin 88 fits into a slit 90 on either side of arm 80, and is secured by means of pivotal locking members 92 on either side of arm 80. The block 86 is spring biased by a spring 94. The block 86 pivots about pin 88 during the tilting of arm 80 so as to maintain proper alignment of screw 84 and the threads within block 86.

The lathe chuck support is best illustrated in FIG. 5 wherein the lathe base plate 100 supports the claw mechanism 102. A mounting plate 104 is securely clamped by means of the claw mechanism to the lathe assembly. Rigidly mounted to the mounting plate 104 is a mounting block 106 containing a dovetail slot 108. Slidably movable within the slot 108 is a dovetail slide 110 driven by a stepper motor 112. The stepper motor rotates (clockwise or counter-clockwise) a screw 114 which is threaded into the threaded bore 116 within the slide 110. A second mounting block 120 is rigidly secured to the dovetail slide 110 by means of a weld 122 or other suitable securing means. Within the mounting block 120 is another dovetail slide 124. Slide 124 is driven in a vertical direction by means of a stepper motor 130 and screw 126. The screw is tightly fitted into the threaded bore 127. The stepper motor 130 is securely fastened to a first extension 128 of the mounting block 120 so that the stepper motor itself is movable in the horizontal direction (via slide 110), together with the mounting block 120, but is stationary with respect to any vertical movement of the slide 124. A second extension 132 also attached to the mounting block 120 is provided with a counter weight 134 to balance the weight of the stepper motor 130. A second counter weight 136 balances the stepper motor 112 during the rotation of the lathe.

As illustrated in FIG. 3 a plurality of terminals 140a–140f are connected to separate metallic rings 142a–142f. The rings 142a–142f are themselves electrically separated from one another by means of insulation means 144. The rings are connected to the computer means via lines 146a–146f, illustrated for simplicity by a single line. Electrical connections to the stepper motors 82, 112 and 130 are made by means of spring loaded carbon brushes 148 slidably engaged with the metallic rings 142a–142f. A bottom electrically insulated plate 150 helps to secure the rings in place. A clamp 152 and housing 154 are also provided to house the rings.

In operation, the stepper motors 112 and 130 as shown in FIG. 5 may be incremented or indexed to sequentially position the points A', P', and B' on the lens 4 (FIGS. 2A and 2B) to coincide with the center of rotation of the lathe CR. Thus, by means of the two crossing dovetail slided, two degrees of freedom are permissible as shown in the horizontal and vertical directions of FIG. 5. Proper indexing of the stepper motors is controlled by the digital control equipment (computer means and interface).

The third dimension or the third degree of freedom as illustrated at FIG. 2 is readily achieved by means of stepper motors 24, 36 and 54. In particular, the radius of curvature of the tool bit relative to the lens 4 is defined as the perpendicular distance between the rotation axis of pin 38, designated as RA in FIG. 3, and the tip of the tool bit 12. Relative displacement of the slide 16 with respect to the receiving block 20 effectively increases or decreases the center of rotation for the multifocal lens. For example, as shown in FIG. 3, a clockwise rotation of pinion 24 would effectively move slide 16 to the left a distance X, thereby increasing by X the distance between the top of the tool bit 12 and line RA. In order to effect an increased radius of curvature in this case, support plate 50 would be moved to the right the same distance X to bring the tool bit in contact with the lens 4. Since stepper motor 36 and pin 38 are rigidly attached to the base plate 30, platform 32 and thus to support plate 50, the distance between the line RA and the tool bit tip remains the same during the lateral movement of support plate 50. Thus, the loci of points as shown in FIG. 2 may readily be achieved by proper positioning of the stepper motor 24. Tool bit itself is positioned along the lathe rotation axis CR and after the proper radius has been set via stepper motor 28, the tool scribes an arc by activation of stepper motor 36. The lens 4 is constantly rotated so that specific areas of the lens are cut to the desired curvature.

The lens tilt may readily be controlled by energizing stepper motor 82 so that the tool bit 12 is aligned along the projection of line A–A', B–B' or in general P–P' of FIG. 2.

The utilization of rotating stepper motors 82, 112 and 130 and the ring structure permits positioning of the lens relative to the lathe rotation axis without stopping lens rotation. Thus, the digital controlled stepper motors 28, 36, 52, 82, 112 and 130 may be indexed to produce the desired lens curvature while the lens is continuously rotating.

Automatic control of the polishing operation for plastic lenses is readily achieved by controlling the temperature and/or flow rate of the polishing fluid. As opposed to the conventional use os fluid as a coolant, the heated fluid provides a means of fusing the plastic surface to eliminate surface irregularities, thus achieving a polishing effect. The optimum fluid temperature is determined empirically according to the particular lens composition, lathe rotation speed and thermal properties of the fluid utilized. The temperature regulation is achieved by comparing the measured temperature from sensor 76 to a reference temperature. In using the computer means 60, an analog to digital converter (not shown) is connected to the sensor outputs to provide digital input data to the computing means. The computer means may then be used to control the pumping speed of the motor in assembly 64 or the heater 74.

The computer means 60 is utilized to privide the control signals to the stepper motor and may be simply a numerical control device fed by a magnetic or paper tape input means as shown at 63. The input information need only specify the successive displacement of the various controlled stepper motors so that the desired line as shown in FIGS. 2, 2A and 2B is provided. Standard stepper motors are readily available from, for example, Superior Electric Company (Slo-Syn No. M.093 FC14 and indexers No. 8F.P.I. 155T). If a mini computer is utilized, the input information may be less specific and the diopter strength of the near and far field regions need only be given. The transformation of the diopter strength to a radius (diopter strength equals to reciprocal of the radius measures in meters) is easily programmable and any of a number of different curves may be specified to define the intermediate points P–P' of FIG. 2. In this case, memory storage means 63' may be used to store the coordinates of intermediate points P–P' for a variety of curves.

Although the invention has been described with reference to the preferred embodiments, it is to be understood that changes and modifications may readily be made by those skilled in the art without deviating from the spirit and scope of the present invention defined by the appended claims.

We claim:
1. Apparatus for automatically forming a multifocal lens from an optical element such as a lens blank comprising:
 means for securing said optical element for rotation about an axis,
 first means for positioning said optical element in a plane,
 tool means for shaping said optical element,
 means for positioning said tool means adjacent said optical element surface,
 means for moving said tool means in an arc about a pivot axis, said pivot axis intersecting said rotation axis,
 means for varying the distance between said tool means and said pivot axis to establish various radii of curvature for said optical element, and
 heating means for heating said optical element to effect a simultaneous lens shaping and polishing.

2. Apparatus as recited in claim 1 wherein said tool means comprises grinding means for grinding said optical element.

3. Apparatus as recited in claim 1 wherein said tool means comprises a tool bit yaving a channel therethrough ]nd said yeating means comprises ] heating fluid passing through said channel for contact with said optical element.

4. Apparatus as recited in claim 1 further comprising tilting means for varying the relative angular position of said tool means and said optical element.

5. Apparatus as recited in claim 4 wherein said tilting means comprises a tilting bracket for tilting said lens relative to said tool means.

6. Apparatus for automatically forming a multifocal lens from an optical element such as a lens blank comprising:
   means for securing said optical element for rotation about an axis,
   first means for positioning said optical element in a plane,
   tool means for shaping said optical element,
   means for positioning said tool means adjacent said optical element surface,
   means for moving said tool means in an arc about a pivot axis, said pivot axis intersecting said rotation axis,
   means for varying the distance between said tool means and said pivot axis to establish various radii of curvature for said optical element, and
   said tool means positioned on one side of said optical element, the point of intersection of said rotation axis and said pivot axis positioned on the other side of said optical element and said pivot axis perpendicular to said rotation axis.

7. Apparatus as recited in claim 1 wherein said first means comprises:
   means for slidably positioning said optical element in a first direction, and
   means for slidably positioning said optical element in a second direction.

8. Apparatus as recited in claim 7 wherein said first and second directions are perpendicular.

9. Apparatus for automatically forming a multifocal lens from an optical element such as a lens blank comprising:
   plate means for securing said optical element for rotation about an axis,
   first means for positioning said optical element in a first and second direction,
   tool means for shaping said optical element,
   means for positioning said tool means adjacent said optical element surface,
   means for moving said tool means in an arc about a pivot axis, said pivot axis intersecting said rotation axis,
   means for varying the distance between said tool means and said pivot axis to establish various radii of curvature for said optical element,
   said means for positioning said optical element in a first direction comprising first motor means secured to saaid plate means for automatically positioning said optical element in said first direction, and
   said means for positioning said optical element in a second direction comprising second motor means secured to said means for positioning said optical element in a first direction for automatically positioning said optical element in a second direction.

10. Apparatus as recited in claim 9 further comprising:
   means for storing control signals, and
   means for feeding said control signals to said first and second motor means.

11. Apparatus as recited in claim 10 further comprising third motor means for automatically varying the distance between said tool means and said pivot axis, said third motor means responsive to said control signals.

12. Apparatus as recited in claim 11 further comprising tilting means for varying the relative angular position of said optical element and said tool means.

13. Apparatus as recited in claim 12 wherein said tilting means comprises fourth motor means for automatically tilting said optical element relative to said tool means, said fourth motor means responsive to said control signals.

14. Appartus for automatically forming a multifocal lens from an optical element comprising:
   means for securing said optical element for rotation about an axis,
   tool means for shaping said optical element,
   means for moving said tool means in an arc about a pivot axis,
   digital control means for providing a first plurality of control signals,
   data storage means for storing said first plurality of control signals,
   automatic motor means responsive to said first plurality of control signals for varying the distance between said tool means and said pivot axis for establishing different radii of curvature for different segments of said optical element,
   said digital control means providing a second plurality of control signals,
   data storage means for storing said second plurality of control signals, and
   motor means responsive to said second plurality of control signals for relatively moving said optical element and said tool means to position different segments of said optical element adjacent said tool means.

15. Apparatus as recited in claim 14 wherein the number of different radii of curvature of said optical element is within the range of two to nine.

16. Apparatus for forming a multifocal surface on an optical element comprising:
   a. a plate mounted for rotation about an axis perpendicular to plane of the plate,
   b. digital control means for providing a plurality of first, second and third output control signals,
   c. means for securing and positioning said optical element on said plate, said securing and positioning means comprising
      means responsive to said first control signals for slidably moving said optical element in a first direction, and
      means responsive to said second control signals for slidably moving said optical element in a second direction,
   d. tool means for forming said multifocal surface,
   e. means for securing said tool means for rotation about a pivot axis, and
   f. means responsive to said third control signals for adjusting the radius of curvature of said tool means about said pivot axis,
      whereby a multifocal optical surface may be generated in response to said plurality of first, second and third control signals.

17. Apparatus as recited in claim 16 wherein said first and second directions are perpendicular.

18. Apparatus as recited in claim 16 wherein said pivot axis is positioned on one side of said optical element and said tool means on the other side of said optical element, said tool means aligned with the axis of rotation of said rotatable plate and said pivot axis intersecting the axis of rotation of said rotatable plate.

19. Apparatus as recited in claim 16 further comprising means for controllably heating said optical element for polishing thereof.

20. Apparatus as recited in claim 19 wherein said heating means comprises:
   a. a fluid,
   b. means for pumping said fluid,
   c. means for directing said fluid onto said optical surface,
   d. means for sensing the temperature of the heating fluid, and
   e. means for increasing the temperature of said fluid in response to said sensing means.

21. Apparatus as recited in claim 20 wherein said optical element is a plastic lens blank.

22. Apparatus as recited in claim 16 wherein said digital control means further provides a fourth control signal and said means for securing said tool means for rotation about the pivot axis is responsive to said foruth control signal.

23. Apparatus as recited in claim 16 wherein said digital control means provides groups of first, second and third control signals, each group corresponding to a different region of the desired multifocal surface.

24. Apparatus as recited in claim 16 wherein said means responsive to said first, second and third control signals comprise stepper motors.

25. A method of manufacturing a multifocal optical surface from an optical element comprising:
   a. rotating said optical element about an axis of rotation,
   b. rotating tool means a wixed uistance about a pivot axis, said pivot axis intersecting said axis of rotation whereby said tool means cuts a region of said optical element,
   c. automatically positioning said optical element to a new position with respect to said rotation axis,
   d. orienting said tool means at a different fixed distance from said pivot axis,
   e. rotating said tool means about said pivot axis thereby cutting a different region of said optical element,
   f. repeating steps c, d and e to produce a plurality of regions on said optical surface, each region having a different focal length, and
   g. heating said optical element simultaneously with rotating said tool means.

26. A method as recited in claim 25 further comprising the steps of:
   pumping a heating fluid for contact with said optical element, and
   regulating the temperature of said heating fluid to polish said optical element.

27. A method of manufacturing a multifocal optical surface from an optical element comprising:
   a. rotating said optical element about an axis or rotation,
   b. rotating tool means a fixed distance about a pivot axis, said pivot axis intersecting said axis of rotation whereby said tool means cuts a region of said optical element,
   d. automatically positioning said optical element to a new position with respect to said rotation axis by slidably moving said optical element in a plane defined by first and second directions,
   d. orienting said tool means at a different fixed distance from said pivot axis,
   e. rotating said tool means about said pivot axis thereby cutting a different region of said optical element,
   f. repeating steps c, d and e to produce a plurality of regions on said optical surface, each regions having a different focal length.

28. A method as recited in claim 27 wherein said plane is substantially perpendicular to said rotation axis.

29. A method as recited in claim 27 further comprising the step of tilting said optical element out of the plane defined by said first and second directions.

* * * * *